United States Patent Office 3,380,804
Patented Apr. 30, 1968

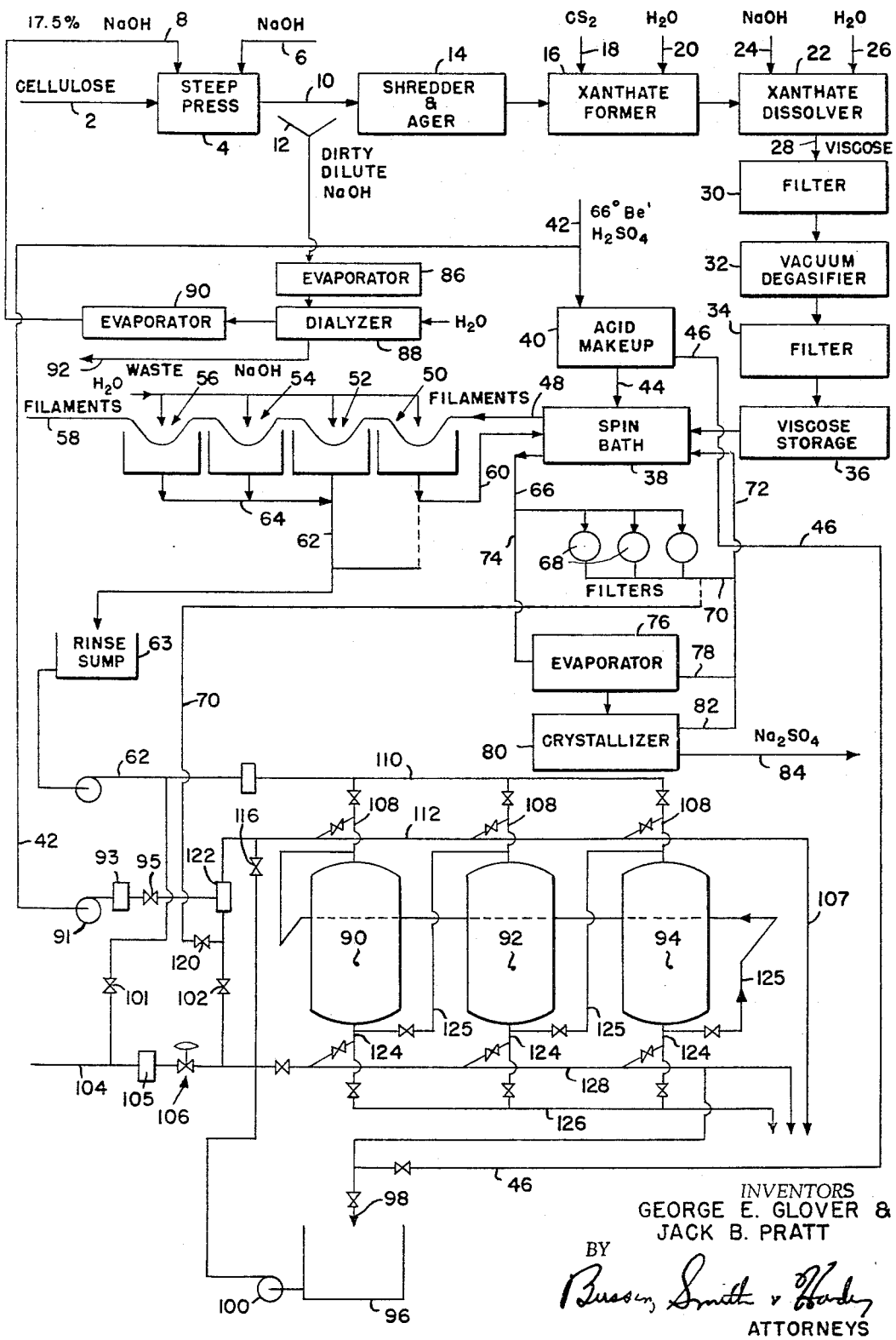

3,380,804
PROCESS FOR ZINC RECOVERY
George E. Glover, Philadelphia, Pa., and Jack B. Pratt, Millside Heights, N.J., assignors to Crane Co., Chicago, Ill., a corporation of Illinois
Filed Aug. 22, 1963, Ser. No. 303,910
10 Claims. (Cl. 23—125)

This invention relates to the recovery of zinc from processes typified by that for the production of viscose rayon, though the invention is applicable to such other processes as use zinc in strongly acid solutions such as the manufacture of vulcanized fiber.

The invention will be primarily described as applicable to the viscose rayon manufacturing process. As is known, in this process cellulose is dissolved as a xanthate by treatment with carbon disulphide and caustic soda and is precipitated from the xanthate solution in an acid spin bath containing as constituents sulphuric acid, sodium sulphate and water and also for the best formation of filaments a considerable concentration of zinc sulphate. A typical bath as newly constituted and essentially maintained may contain, by weight, 8% sulphuric acid, 12% sodium sulphate and 6% zinc sulphate, the remainder being water. As the spinning operation proceeds carbon disulphide is liberated and cellulose waste accumulates in the bath. Since sulphuric acid neutralizes the alkali of the xanthate, sulphuric acid must be added. There is also accumulation of water from the incoming xanthate solution and this is removed by evaporation. Excess sodium sulphate accumulates and this is held at proper concentration by crystallization. Drag out removes all of the constituents including the valuable zinc. The filaments which are formed must be rinsed and the zinc thus enters the rinse water. Not only because it is valuable but also because it is toxic, the zinc is desirably recovered. Sometimes this is accomplished by precipitation with lime which forms zinc hydroxide and calcium sulphate. The recovery of zinc from this mixture is an expensive procedure and settling tanks of large size are required to accumulate the precipitated sludge.

Attempts at removal of the zinc by ion exchange have not heretofore proved very economical because of the high acid concentration in the rinse water and because in the regeneration effluent, containing the zinc, acid dilutions have been required adding large amounts of water which had to be removed by an undue extent of evaporation.

In accordance with the present invention zinc recovery is effected by ion exchange and the regeneration process is carried out using concentrated acid providing a zinc solution which may be returned directly to the spin bath. To assist further in attainment of this result a multiple step reclaiming procedure is used for the efficient recovery of the zinc with maintenance of a minimum water content of the effluent. A series ion exchange loading procedure is also used to achieve very complete removal of zinc and to attain additional zinc loading per unit of ion exchange resin and is tied in with the reclaiming procedure, achieving reduced acid consumption and thereby reduction in quantity of dilution water.

The general objects of the invention have to do with the achievement of the foregoing results, and these and their attainment will become more apparent from the following description, read in conjunction with the accompanying drawing in which the figure is a flow diagram of a preferred procedure in accordance with the invention carried out for zinc recovery in the operation of a viscose rayon plant.

The upper portion of the flow diagram illustrates, as background, a viscose rayon process which is largely conventional and hence will not be described in great detail.

Cellulose in sheet form is fed at 2 into a steep press 4 to which caustic soda solution is added at 6 and 8, that added at 6 being new makeup, and that added at 8 being recovered as hereafter mentioned. The sheet leaves the press 4 at 10 and drainings of dirty dilute sodium hydroxide are caught at 12 to be reprocessed. The sheet then passes to a shredder and an ager indicated in a single block at 14 though generally these are separate units. The shredded cellulose then passes to the xanthate former 16 which is fed with carbon disulphide at 18 and with water at 20. Following this it flows to the xanthate dissolver 22 fed with sodium hydroxide solution at 24 and additional water at 26. From this the viscose solution passes at 28 and is subjected to successive filtering at 30, vacuum degasification at 32 and further filtering at 34, winding up in the viscose storage tanks at 36 from which the solution is drawn as required. The viscose solution enters the conventional spin bath 38 to which acid (and zinc as hereinafter more fully described) are added from a makeup tank indicated at 40, this tank being fed with concentrated sulphuric acid at 42 and with other constituents as will appear later at 46. Makeup zinc may also be added to this tank, though in accordance with the invention this makeup is very minor, the zinc being primarily recycled in the process.

The filaments pass from the spin bath at 48 and are subject to successive rinses with low hardness water at 50, 52, 54 and 56. The first rinse at 50 is, in the present process, distinguished from subsequent rinses. The filaments finally emerging at 58 are thus washed and suitable for further conventional processing which forms no part of this invention.

On the drawing is shown a parallel fed, multitank, continuous, rinse system which is frequently used for a continuous filament, and here the zinc rich rinse water is available from a single vessel. It is the intent here to include also countercurrent fed, multitank, continuous, rinse systems. It is also the intent to include batch type rinses such as used for fiber in spools. In the batch rinse of pools or "cakes," the first portion of the effluent rinse water is rich in zinc and is equivalent for the purpose of this description to the zinc rich effluent from the first rinse in a continuous rinse system. It is also the intent to include combinations of the parallel fed, countercurrent fed, continuous systems and the batch systems.

The solution from the first rinse is concentrated in zinc sulphate, sulphuric acid and sodium sulphate and is suitable for partial return at 60 to the spin bath. The quantity of this first rinse solution thus returned is determined by the composition of the spin bath which is continuously carefully checked since the amounts of its constituents are critical for proper production. The composition varies with the particular results desired, but this careful maintenance of proportions is true of all rayon production.

The portions of the first rinse solution not returned and the more dilute solutions from the subsequent rinsing stages, leaving these at 64, are merged and passed through the line 62 to a rinse sump 63 to be subjected to ion exchange as described later. Heretofore the solutions resulting from rinsing were generally subjected to precipitation of the zinc as described above.

Because of accumulation of cellulose and dirt in the spin bath it is generally desirable to recirculate a part of this bath continuously as indicated at 66 through filters 68, the clear solution emerging at 70 to the line 72 for return to the bath 38. Another portion of the spin bath is drawn off at 74 to an evaporator 76 in which concentration is effected by removal of water. Some of this concentrated solution is returned at 78 and through line 72 to the spin bath. Another portion of the concentrated solution from the evaporator passes to a crystallizer 80 where further concentration is achieved together with crystallization of the sodium sulphate, the mother liquor being returned at 82 to line 72 and the spin bath. The crystalline sodium sulphate containing only very little zinc is removed at 84.

The dilute caustic soda collected at 12 is usually concentrated by an evaporator 86, then subjected to dialysis at 88, and then further concentrated at 90 to be returned to the system at 8. The waste at 92 may be discarded or used as low grade caustic solution.

To the extent so far described the process is essentially conventional, the filtering, makeup, evaporation and crystallization being carried out to maintain the spin bath essentially constant in composition by reason of the removal of water and sodium sulphate, with addition of zinc sulphate to maintain the zinc concentration and with the addition of sulphuric acid to maintain the concentration of this constituent. Carbon disulphide is, of course, recovered, though this recovery is not illustrated. In the portion of the figure so far described pumps, valves and other control and material handling equipment are not detailed since they are irrelevant and conventional.

Reference may now be made to the lower portion of the diagram which is in the nature of a perspective flow diagram showing the cation exchangers 90, 92 and 94 and a reclaim tank 96 and their interconections. A single reclaim tank is shown although in practice several stages may be employed. Reclaim tank 96 receives regenerant acid containing a small concentration of zinc via line 98. Pump 100 reinjects the zinc lean acid over an exchanger bed that is heavily loaded with zinc and the resulting zinc rich acid is discharged via line 46 to spin bath make up tank 40.

Concentrated acid, which is a portion of the acid normally added directly to the spin bath, is withdrawn from storage via line 42 by pump 91 and injected via a rate of flow indicator 93 and a check valve 95 into a mixing chamber 122 where it is diluted in stream. The liquid used for dilution may be soft water entering at line 104 via a rate of flow indicator 105 and a pressure reducing valve 106, or rinse water entering at 101, or a portion of the spin bath entering from line 70 through valve 120 or any combination of these.

The ion exchangers have inlet conections 108 selectively connectable to feed inlet header 110, outlet of appropriate series connection 125, and an upper auxiliary header 112 through which all regeneration flows pass.

Outlet connections from the cation exchangers are provided at 124 and are arranged to be selectively connectable to outlet header 126, inlet of appropriate series connection 125, and a lower auxiliary header through which all regeneration flows pass.

The inlets to the upper auxiliary header are diluted virgin acid from the mixing chamber 122, from reclaim acid tank 96 via valve 116, and, of course, displacement water only enters through the acid mixing chamber 122 and valve 102 with the acid flow stopped.

The outlet from the upper header is to waste at 107.

The inlets to the lower auxiliary header is water for backwashing. This water may be either soft water via line 104 or rinse water via valve 101.

The outlets from the lower auxiliary header are to waste, zinc lean regenerant acid to reclaim tank 96, and zinc rich acid to spin bath makeup tank 46.

Various valves are provided as illustrated to make selective connections for the operations about to be described while other valves and connections are of conventional types providing for washing of the exchangers and the like. The purposes of the valves will be obvious from the following description of operation. Pumps may be provided where required to maintain flows.

The operation of the portion of the system described pertaining to conventional filament formation need not be detailed but will be obvious from the mere description heretofore provided with respect to the elements involved.

The invention is primarily directed to the matter of the cation exchange and regeneration with reclaiming of the spent regenerant, and in accordance with the invention this is carried out in a fashion which will not interrupt the main aspects of filament formation.

The solution which is subjected to ion exchange is the aqueous solution containing zinc sulphate, sulphuric acid and sodium sulphate passing from the rinses through the line 62. A typical cycle may be assumed which would involve the exchangers 90 and 92 treating this solution while the exchanger 94 is undergoing regeneration. Considering first the ion exchange part of the operation, and anticipating what will become clearer hereafter, it may be assumed that the exchanger 92 was the last of the group previously regenerated while the regeneration of the exchanger 90 occurred earlier. Under these conditions, the resin in exchanger 92 will be less exhausted than the resin in exchanger 90 and this will result in more complete removal of zinc and consequently less zinc leakage to waste out of line 126. The flow path during the loading with exchanger 90 upstream and exchanger 92 downstream is: zinc laden rinse water 62 enters feed header 110 and then via top inlet connection 108 passes downward to bottom connection 124 and enters series connection 125 and thence to the top inlet connection 108 of exchanger 92, downward through the exchanger to the lower connection 124 and thence into outlet header 126 with zinc depleted water passing to waste.

The regeneration of the third exchanger 94 takes place in three successive steps.

Assuming a startup of operation, the reclaim tank 96 may be charged with regenerant equal in concentration to the normal dilute fresh acid such as would be developed in the mixing chamber 122 except that no zinc would be present, except in the case in which spin bath is used to dilute the fresh acid, the zinc content of the start up reclaim regenerant then being only that due to the spin bath.

The first step in regeneration would be to pump the acid solution from the reclaim tank 96 through valve 116 and via upper auxiliary header 112 into top of exchanger 94. Flow passes through exchanger into bottom outlet 124 then into bottom auxiliary header 128 and thence to waste until the initial exchanger content, being zinc free rinse water, is displaced. The continuation of the flow, being reclaim regenerant now further enriched with zinc eluted from the exchanger passes via appropriate valve into line 46 and thence to spin bath makeup tank 40.

By reason of the concentration of the acid used, which here, and as described below, is much greater than that used in the spin bath, and as a result of this regeneration procedure the zinc concentration being greater than that used in the spin bath, this eluant is suitable for delivery to the spin bath.

The second step is to pass concentrated virgin sulfuric acid which has been diluted in-stream in a mixing chamber 122 with soft water or rinse water entering at valve 102, or with filtered spin bath entering at valve 120. The virgin acid follows the same path as the reclaim acid in step one, except that in passing over the exchanger a lesser amount of zinc is eluted and the resulting zinc lean acid is directed via valve 98 into tank 96.

A third step completes the regeneration. Here the virgin acid flow is stopped and water only is directed through the regeneration path to displace the virgin acid from the piping and the exchanger. Where the virgin acid is being diluted with spin bath, the spin bath flow is also stopped and water, either soft or rinse water used to complete the displacement of the virgin acid with its slight content of zinc into reclaim tank 96.

The desirable acid which is formed by dilution, such dilution operation may be batchwise or in-stream as described above, has a concentration of 20%–40%. It may be noted that dilution to this concentration will produce temperatures of the order of 190° F. so the regeneration is quite hot. The use of hot acid is however not essential to this process.

The foregoing may be taken to represent the initial regeneration and reclaim cycle; but as will appear this is essentially typical of later cycles when operation is fully underway.

The exchanger 94 is now regenerated and ready to go into its zinc recovery operation. For this flow routings are changed by obvious manipulation of valves so that the exchangers 92 and 94 now receive the rinse solution in series, the solution first passing to the exchanger 92 and then to the exchanger 94. The exchanger 90 is now the one to undergo regeneration.

As before, in the first step of the regeneration the acid from tank 96 is first passed into the exchanger 90 and thence is directed into the spin bath makeup tank 40. As already noted, the tank 96 will contain acid with an intermediate zinc content. In passing through exchanger 90, the zinc concentration is considerably increased so that the zinc rich acid is directed into the spin bath makeup tank 40.

In the second step, concentrated acid is again mixed with water or with spin bath to secure a concentration of about 35% acid and is passed through exchanger 90 to remove substantially all of the residual zinc and the resulting acid containing now an intermediate concentration of zinc is directed to reclaim tank 96.

Following this the cyclical usage of the exchangers continues, 94 and 90 being placed in series with 94 receiving the rinse solution first, while the exchanger 92 is taken out of the ion exchange cycle for regeneration in the fashion just described.

These successive operations are then cyclically repeated, subject to necessary interruptions from time to time to renew the exchange material and to provide conventional backwashing to clean the exchangers of accumulated dirt which in this case may be cellulose particles.

It will be noted that in the foregoing regeneration involves the use of quite concentrated sulphuric acid and particularly such acid in a quite hot condition. Various exchange materials are available which will have a useful life under these rather demanding conditions. For example, one such cation exchange resin is commercially marketed under the name of Nalco HCR–W, and is understood to involve a styrene base resin cross-linked with divinyl benzene. Another suitable resin is commercially available designated as Rohm and Haas Amberlite IR–200. While these resins are particularly applicable, various standard cation exchange resins can withstand the rigors of the hot and concentrated acid treatment for an economic number of cycles. While their normal life is shortened, nevertheless the advantages of the described process are such that this shortened life is economically well tolerated. The factors which give rise to this condition are largely those of the benefit of a highly favorable water balance cutting down very considerably the costly removal of water by evaporation. Consistent with this is the concurrent achievement of a high zinc concentration in the regenerant returned to the spin bath.

The series usage of the ion exchangers permits the initial exchanger to stay on stream beyond the point where leakage of zinc becomes significant. Continued operation in the upstream position allows the resin to become fully loaded with non-hydrogen ions and then to absorb more zinc by the zinc in the feed displacing off previously absorbed sodium. Tolerating more zinc leakage from the upstream unit allows greater zinc removal capacity in terms of pounds of zinc per cubic foot of resin; the heavier loading of zinc allows greater acid efficiency in terms of pounds of zinc exchanged per pound of virgin acid employed; and the reduction in the quantity of virgin acid employed reduces the volume of dilution water employed in terms of gallons of water per pound of zinc.

This dilution water must be subsequently removed by evaporation and the evaporation cost is the chief operating cost of the system. Also the high unit loading of zinc per cubic foot of resin reduces the size and cost of the recovery system.

It may be noted here that the chief purpose of this system is to reduce the operating cost by reduction of the evaporation cost and this is accomplished by minimizing the amount of water added in dilution of regenerant acid, and this is accomplished by limiting the dilution of the acid to about 35% which is much higher than conventionally used. In the case where the acid is diluted with filtered spin bath there is no addition of water to the spin bath circuit; however the normal zinc content of the spin bath causes the dilute virgin acid to have an appreciable zinc content and therefore, other things being equal, reduces somewhat the effectiveness of the regeneration as measured by the pounds of zinc removed per cubic foot of resin and the leakage of zinc in subsequent cycles. It is believed that the hydrogen ion-zinc ion concentration ratio in the virgin acid determines the effectiveness of the regeneration. This ratio is maximized by the use of only sufficient diluent to yield a dilute acid of about 35%.

It may also be noted here that the foregoing description of the mechanics of the process, particularly regarding series loading, has been in terms of multiple tanks and downward flows. This process may be similarly accomplished in a single vessel, or similarly accomplished with flow direction either up or down. All that is necessary is that the described flows be directed in the described sequence over a segment of the total resin. This can be accomplished by the employment of multiple distributors within a stationary single bed or by physically moving the resin past a single set of distributors.

In the regeneration considerably more sulphuric acid is passed through an exchanger than would be necessary for regeneration; but there is no disadvantage to this in view of the fact that in the viscose rayon process large amounts of acid must be used in any event. The fact that a large excess must be used balances two disadvantages which might otherwise impede the use of strong acid for regeneration. First, if only the proper amount of strong acid was used, the volume used would be less than that sufficient to wash over well the contents of the exchanger. Secondly, high strength acid is less completely ionized and consequently is less effective in providing hydrogen ions for exchange per molecule of acid applied. But both of these situations are taken care of by the considerable excess of acid passing through the exchanger for regeneration.

While the concentration of the regenerant sulphuric acid has been indicated as 35%, this concentration is subject to variation, though it should be as high as possible as may be consistent with the overall economics of the system. If higher concentrations are used, the life of the resins may be substantially shortened, but the greater resulting cost of replacing resins may be balanced against the advantages of maintenance of water input to a low figure eliminating extra costs of evaporation. Lower acid concentrations may, of course, be used, but at the expense of additional input of water which may provide too great a dilution in the spin bath.

As has been pointed out in the foregoing description, some of the solution from the first rinse tank 50 may be directly returned to the spin bath. The amount thus returned may be economically balanced against the amount which passes to the cation exchangers. Sodium sulphate removal is a factor here to be considered. If this rinse solution is returned to the spin bath it carries with it the dragged out sodium sulphate; whereas if passed to the cation exchangers the sodium sulphate is removed, to a considerable extent, from the system, thus lightening the duty of the crystallizer. However, the passage of more of this first rinse solution to the exchangers will accelerate loading with zinc, and depending upon the particular process involved, and primarily the desired content of the spin bath, the proportioning of returned rinse solution to that passing to the cation exchangers may be determined. Return of water to the spin bath is also a factor to be considered. In brief, various details of the matter of operation may be varied from the standpoint of proportioning of flow in dependence upon the particular process involved in the rayon manufacture.

It will be evident that what has been described is also applicable to other processes which involve the use of zinc salts in concentrated and acidic solutions. For example, in the production of so-called vulcanized fiber concentrated zinc chloride solutions are used, and here again washing is involved adding undue amounts of water. By adoption of the same procedure as outlined above, but using hydrochloric acid instead of sulphuric acid for regeneration, zinc recovery may be effected consistently with the maintenance of a minimum of water in the system.

Various modifications of what has been described may be employed and it will be understood that the invention is not to be considered as limited except as required by the following claims.

What is claimed is:

1. In a process involving treatment of a material in a concentrated acidic treating solution containing zinc and rinsing with water of the material after removal from said solution, that auxiliary procedure for the recovery of zinc with minimizing of addition of water including passing the zinc-containing aqueous solution resulting from rinsing through a cation exchanger to remove the zinc content therefrom, regenerating said cation exchanger by passing therethrough a concentrated acid solution having an acid concentration substantially exceeding that of said treating solution, and introducing the eluant from the regenerating step to said treating solution.

2. A process according to claim 1 in which the acid in said treating solution and used for regeneration is aqueous sulphuric acid having an acid concentration in excess of 20%.

3. In a process involving treatment of a material in a concentrated acidic treating solution containing zinc and rinsing with water of the material after removal from said solution, that auxiliary procedure for the recovery of zinc with minimizing of addition of water including passing the zinc-containing aqueous solution resulting from rinsing through a plurality of cation exchangers in series to remove the zinc content therefrom, regenerating said cation exchangers by passing therethrough concentrated acid solutions each having an acid concentration substantially exceeding that of said treating solution, and introducing the eluant from the regenerating step to said treating solution.

4. A process according to claim 3 in which the acid in said treating solution and used for regeneration is aqueous sulphuric acid having an acid concentration in excess of 20%.

5. In a process involving treatment of a material in a concentrated acidic treating solution containing zinc and rinsing with water of the material after removal from said solution, that auxiliary procedure for the recovery of zinc with minimizing of addition of water including passing the zinc-containing aqueous solution resulting from rinsing through a plurality of cation exchangers in series to remove the zinc content, said exchangers being part of a group of which one is being regenerated while the others are involved in such zinc-removing action, regenerating the exchanger undergoing regeneration by a series of steps in the first of which there is passed therethrough a concentrated acid solution containing a larger amount of zinc resulting from regeneration of another of said exchangers and introducing the eluant from the regenerating step to said treating solution, in the second of which there is passed therethrough a concentrated solution containing a smaller amount of zinc resulting from regeneration of another of said exchangers and storing the eluant from this second regenerating step for subsequent use in the first step of regeneration of another exchanger, and in the third of which there is passed therethrough a concentrated acid solution from which zinc is substantially absent and storing the eluant from this third step for subsequent use in the second step of regeneration of another exchanger, the acid concentration in each of said regenerating solutions substantially exceeding that of said treating solution.

6. A process according to claim 5 in which the acid in said treating solution and used for regeneration is aqueous sulphuric acid having an acid concentration in excess of 20%.

7. In a process involving treatment of a material in a concentrated acidic treating solution containing zinc and rinsing with water of the material after removal from said solution, that auxiliary procedure for the recovery of zinc with minimizing of addition of water including passing the zinc-containing aqueous solution resulting from rinsing through a plurality of cation exchangers in series to remove the zinc content, said exchangers being part of a group of which one is being regenerated while the others are involved in such zinc-removing action, regenerating the exchanger undergoing regeneration by a series of at least two steps in the first of which there is passed therethrough a concentrated acid solution containing a larger amount of zinc resulting from regeneration of another of said exchangers and introducing the eluant from the regenerating step to said treating solution, and in the second of which there is passed therethrough a concentrated solution containing a smaller amount of zinc resulting from regeneration of another of said exchangers and storing the eluant from this second regenerating step for subsequent use in the first step of regeneration of another exchanger, the acid concentration in each of said regenerating solutions substantially exceeding that of said treating solution.

8. A process according to claim 7 in which the acid in said treating solution and used for regeneration is aqueous sulphuric acid having an acid concentration in excess of 20%.

9. In a process involving treatment of a material in a concentrated acidic treating solution containing zinc and rinsing with water of the material after removal from said solution, that auxiliary procedure for the recovery of zinc with minimizing of addition of water including passing the zinc-containing aqueous solution resulting from rinsing through a cation exchanger to remove the zinc content therefrom, regenerating said cation exchanger by passing therethrough a concentrated acid solution having an acid concentration substantially exceeding that of said treating solution and produced by dilution of concentrated acid with said acidic treating solution, and introducing the eluant from the regenerating step to said treating solution.

10. A process according to claim 9 in which the acid in said treating solution and used for regeneration is aqueous sulphuric acid having an acid concentration in excess of 20%.

References Cited

UNITED STATES PATENTS

| | | | |
|---|---|---|---|
| 3,305,306 | 2/1967 | Morawe et al. | 23—125 X |
| 2,754,261 | 7/1956 | Akeroyd | 210—32 X |
| 2,774,732 | 12/1956 | Blight | 210—30 X |
| 2,954,276 | 9/1960 | Hazen | 23—125 |

OSCAR R. VERTIZ, *Primary Examiner.*

EARL C. THOMAS, *Examiner.*